United States Patent
Botusescu et al.

(10) Patent No.: US 9,864,916 B2
(45) Date of Patent: Jan. 9, 2018

(54) METHOD FOR TRIGGERING A DRIVER ASSISTANCE FUNCTION UPON DETECTION OF A BRAKE LIGHT BY A CAMERA

(71) Applicant: Continental Automotive GmbH, Hannover (DE)

(72) Inventors: Adrian Botusescu, Timisoara (RO); Radu Ciucur, Timisoara (RO); Nicolae Pahontu, Campia Turzii (RO); Sabin Catana, Timisoara (RO); Valentin Vintila, Timisoara (RO)

(73) Assignee: Continental Automotive GmbH, Hannover (DE)

( * ) Notice: Subject to any disclaimer, the term of this patent is extended or adjusted under 35 U.S.C. 154(b) by 170 days.

(21) Appl. No.: 14/777,662

(22) PCT Filed: Mar. 7, 2014

(86) PCT No.: PCT/DE2014/200116
§ 371 (c)(1),
(2) Date: Sep. 16, 2015

(87) PCT Pub. No.: WO2014/154213
PCT Pub. Date: Oct. 2, 2014

(65) Prior Publication Data
US 2016/0110620 A1  Apr. 21, 2016

(30) Foreign Application Priority Data

Mar. 26, 2013 (EP) .................................... 13464003
Apr. 29, 2013 (DE) ......................... 10 2013 104 335

(51) Int. Cl.
*G06K 9/00* (2006.01)
*B60T 7/22* (2006.01)
(Continued)

(52) U.S. Cl.
CPC ......... *G06K 9/00825* (2013.01); *B60Q 9/008* (2013.01); *B60T 7/22* (2013.01);
(Continued)

(58) Field of Classification Search
CPC .. G06K 9/00825; G96K 9/4652; H04N 7/185; G06T 7/408; B60Q 9/008; B60T 7/22
(Continued)

(56) References Cited

U.S. PATENT DOCUMENTS 5,896,084 A * 4/1999 Weiss .................... B60Q 1/2696
340/468
8,218,009 B2  7/2012 Heinrich et al.
(Continued)

FOREIGN PATENT DOCUMENTS

DE  102009025545  12/2010
DE  102012000459  7/2012
(Continued)

OTHER PUBLICATIONS

International Search Report of the International Searching Authority for International Application PCT/DE2014/200116, dated Aug. 26, 2014, 3 pages, European Patent Office, HV Rijswijk, Netherlands.
(Continued)

*Primary Examiner* — Hee-Yong Kim
(74) *Attorney, Agent, or Firm* — W. F. Fasse

(57) ABSTRACT

In a method for triggering a driver assistance function of a subject vehicle, image data of surroundings in front of the vehicle is generated by a camera and supplied to an analyzing unit. A driver assistance function is triggered upon detection of a brake light of an other vehicle in the image data. A geometric region of the detected other vehicle is determined as exhibiting the highest pixel brightness values and the color red. The geometric region is detected as a raised brake light of the other vehicle if the geometric region
(Continued)

is positioned essentially in the middle of the horizontal structure of the other vehicle, or at least a predetermined height above the roadway, or at least a predetermined distance below a rear window of the other vehicle.

15 Claims, 2 Drawing Sheets

(51) Int. Cl.

| | | |
|---|---|---|
| G06T 7/40 | (2017.01) | |
| B60Q 9/00 | (2006.01) | |
| G06K 9/46 | (2006.01) | |
| H04N 7/18 | (2006.01) | |
| B60Q 1/26 | (2006.01) | |
| G06K 9/34 | (2006.01) | |
| B60T 17/22 | (2006.01) | |
| G06T 7/90 | (2017.01) | |

(52) U.S. Cl.
CPC ............ *B60T 17/22* (2013.01); *G06K 9/4652* (2013.01); *G06T 7/90* (2017.01); *H04N 7/185* (2013.01); *B60T 2201/022* (2013.01); *B60T 2210/32* (2013.01)

(58) Field of Classification Search
USPC .......................................................... 348/148
See application file for complete search history.

(56) References Cited

U.S. PATENT DOCUMENTS

| | | |
|---|---|---|
| 8,254,632 B2 | 8/2012 | Heinrich et al. |
| 2007/0255480 A1 | 11/2007 | Southall et al. |
| 2008/0030374 A1 | 2/2008 | Kumon et al. |
| 2008/0088481 A1 | 4/2008 | Kumon et al. |
| 2009/0190827 A1 | 7/2009 | Saito |
| 2012/0176499 A1 | 7/2012 | Winter et al. |
| 2014/0160252 A1 | 6/2014 | Randler et al. |
| 2014/0293055 A1 | 10/2014 | Otsuka |
| 2015/0254516 A1 | 9/2015 | Adomat et al. |

FOREIGN PATENT DOCUMENTS

| | | |
|---|---|---|
| JP | 08-166221 A | 6/1996 |
| JP | 2006-189148 A | 8/2008 |
| JP | 2009-048566 A | 3/2009 |
| WO | WO 2010/145848 | 12/2010 |

OTHER PUBLICATIONS

English Translation of PCT International Preliminary Report on Patentability of the International Searching Authority for International Application PCT/DE2014/200116, dated Oct. 8, 2015, 11 pages, International Bureau of WIPO, Geneva, Switzerland.
German Search Report for German Patent Application No. 10 2013 104 335.6, dated Mar. 27, 2014, 5 pages, Muenchen, Germany, with English translation, 5 pages.
"ECE Regelung 48" (ECE Regulation 48), Amtsblatt der Europäischen Union (Official Journal of the European Union), pp. L323/46 to L323/152, Dec. 6, 2011, 10055135261, Bundesministerium für Verkehr und digitale Infrastruktur (Federal Ministry of Traffic and Digital Infrastructure), with English version, retrieved from the internet on Aug. 19, 2014 at: http://www.bmvi.de/SharedDocs/DE/Anlage/static/ECE/r-48-beleuchtung-lichtsignaleinrich-tungen-kfz-pdf.pdf?__blob=publicationFile.
"ECE Regelung 7" (ECE Regulation 7), Amtsblatt der Europäischen Union (Official Journal of the European Union), pp. L148/1 to L148/33, Jun. 12, 2010, XP055135412, with English version, retrieved from the internet on Aug. 19, 2014 at: http://www.bmvi.de/SharedDocs/DE/Anlage/static/ECE/r-7-begrenzungs-schluss-bremsleuchten-pdf.pdf?__blob=publicationFile.
"Gesetzliche Vorschriften für Kraftfahrzeuge und Trailer gemäß ECE Regelung 48" (Statutory Requirements for Motor Vehicles and Trailers According to ECE Regulation 48): "Hella KGaA: Ideen für das Auto der Zukunft" (Hella KGaA: Ideas for the Automobile of the Future), Feb. 11, 2013, XP055135225, pp. 1 to 40, retrieved from the internet on Aug. 19, 2014 at: https://web.archive.org/web/20130211094833/http://www.hella.com/hella-com/assets/media/J00268_Gesetzliche_Vorschriften.pdf.
A. Bensrhair et al., "Stereo Vision-Based Feature Extraction for Vehicle Detection", Intelligent Vehicle Symposium 2002, IEEE, Piscataway, NJ, USA, Jun. 17, 2002, XP010635868, vol. 2, pp. 465 to 470.
Xinting Gao et al., "Implementation of Auto-Rectification and Depth Estimation of Stereo Video in a Real-Time Smart Camera System", Computer Vision and Pattern Recognition Workshops 2008, IEEE, Piscataway, NJ, USA, Jun. 23, 2008, XP031285701, pp. 1 to 7 especially pp. 1 to 2.
Sergiu Nedevschi et al., "Stereo-Based Pedestrian Detection for Collision-Avoidance Applications", IEEE Transactions on Intelligent Transportation Systems, vol. 10, No. 3, Sep. 1, 2009, Piscataway, NJ, USA, XP011347182, pp. 380 to 391.
Partial English translation of Japanese Office Action in Japanese Patent Application No. 2016-504490, dated Sep. 27, 2017, 3 pages.

\* cited by examiner

METHOD FOR TRIGGERING A DRIVER ASSISTANCE FUNCTION UPON DETECTION OF A BRAKE LIGHT BY A CAMERA

FIELD OF THE INVENTION

The invention relates to a method of triggering a driver assistance function of a subject vehicle upon detection of a brake light (also called a "stop light" herein) of another vehicle in image data of a camera of the subject vehicle.

BACKGROUND INFORMATION

A generic method is known from DE 10 2009 025 545 A1, in which that part of the surroundings of a vehicle which is in front of the vehicle is covered by means of a vehicle camera and analyzed with respect to the detection of flashing signals (stop lights in particular) in the image data. If a stop light is detected, automatic driver assistance control (e.g., longitudinal control and/or lateral control) is performed. DE 10 2009 025 545 A1 also proposes outputting information signals to a visual display device and/or an acoustic output device if a stop light is detected. Stop lights are detected as a result of the subdivision of the image data into sections (bottom central section, bottom left section, bottom right section) so that also a raised stop light (third stop light) can be detected. Furthermore, color differentiation is performed for the purpose of distinguishing the red stop lights from the orange or yellow flashing lights.

DE 10 2009 025 545 A1 also describes a method for the detection of stop light systems by means of an analysis of image data of that part of the surroundings of the vehicle which is in front of the vehicle, said image data being acquired by means of a vehicle camera. If a vehicle is detected in the image by means of an analyzing unit connected to the camera system, an image sector associated with this vehicle is subdivided into a left section, a central section, and a right section. On the basis of brightness values of the pixels contained in these sections, at least one brightest image segment is extracted from each of these sections and checked in each case to see whether the extracted image segment from the left section and the extracted image segment from the right section are equally sized and situated at the same height and whether the brightest image segment from the central section is situated in a higher and centered position between the brightest image segments from the left and right sections. If this is the case, the analyzing unit outputs a stop light signal that causes the stop light of the vehicle to be activated.

The purpose of equipping vehicles with a third brake light (also known as a raised brake light, a center high-mounted stop lamp, or a center-mounted brake light) consists in increasing the attention of a driver of a following vehicle in order to reduce the risk of rear-end collisions. Especially when driving in a convoy of vehicles, drivers are required to be very careful so that braking operations performed by vehicles driving ahead of the vehicle driving immediately ahead of the ego-vehicle (i.e. subject vehicle) can be detected early enough since the low-mounted bilateral brake lights of those braking vehicles are often covered by the vehicle driving immediately ahead of the ego-vehicle so that, e.g., only the high-mounted third brake light is visible.

SUMMARY OF THE INVENTION

An object of an embodiment of the invention is to further develop a method of the type mentioned at the beginning in such a manner that the driver is assisted in detecting brake or stop lights of vehicles driving ahead of the ego-vehicle (i.e. subject vehicle) in a convoy of vehicles, when the low-mounted bilateral brake lights of those vehicles driving ahead are partially covered by the vehicle driving immediately ahead of the ego-vehicle.

This object can be achieved by embodiments of a method having the features according to the invention as set forth herein.

According to the first inventive embodiment, such a method for triggering a driver assistance function of a vehicle, in which image data of that part of the surroundings of the vehicle which is in front of the vehicle is generated by means of a camera and supplied to an analyzing unit for the purpose of analysis and the driver assistance function is triggered upon detection of a stop light of a further vehicle detected as an object, said stop light being contained in the image data, is characterized in that at least one geometric region of a detected object is determined in the image data, the pixels of said region essentially exhibiting the highest brightness values in the image data and the spectral color red, and the geometric region is detected as a raised stop light of the further vehicle if the geometric region is detected to be positioned essentially in the middle of the horizontal structure of the detected object.

It is thus possible to detect the driving state of vehicles driving ahead of the ego-vehicle in the convoy of vehicles (particularly, the braking state of those vehicles generated by the driver by actuating the brake pedal) on the basis of the raised stop lights of those vehicles if the left and right stop lights of those vehicles are covered by a vehicle driving immediately ahead of the ego-vehicle or by other objects. In particular, the statutory provision stipulating that such a raised stop light must be arranged in the middle of the rear side of the vehicle is made use of for the purpose of detecting such a stop light.

According to an advantageous realization of the invention, the geometric region is detected as a raised stop light of the further vehicle if the geometric region is additionally positioned at least at a predetermined height above the pavement, thus making use of the statutory provision stipulating that such a raised stop light must be mounted on the rear side of the vehicle at least 850 mm above the pavement.

Furthermore, according to the second inventive embodiment, the inventive method is characterized in that at least one geometric region of a detected object is determined in the image data, the pixels of said region essentially exhibiting the highest brightness values and the spectral color red, and the geometric region is detected as a raised stop light of the further vehicle if the geometric region is positioned at least at a predetermined height above the pavement.

This inventive solution provides a further possibility of detecting the driving state of vehicles driving ahead of the ego-vehicle in the convoy of vehicles (particularly, the braking state of those vehicles generated by the driver by actuating the brake pedal) on the basis of the raised stop lights of those vehicles if the left and right stop lights of those vehicles are covered by a vehicle driving immediately ahead of the ego-vehicle or by other objects. In particular, the statutory provision stipulating that the raised stop light must be arranged on the rear side of the vehicle at a predetermined minimum height of 850 mm above the pavement is made use of for the purpose of detecting such a stop light.

The third inventive embodiment is characterized in that
at least one geometric region of a detected object is
determined in the image data, the pixels of said region
essentially exhibiting the highest brightness values and
the spectral color red, and
the geometric region is detected as a raised stop light of
the further vehicle if the geometric region is positioned
at a predetermined distance below a detected rear
window of the further vehicle.

Finally, this inventive solution provides a further possibility of detecting the driving state of vehicles driving ahead of the ego-vehicle in the convoy of vehicles (particularly, the braking state of those vehicles generated by the driver by actuating the brake pedal) on the basis of the raised stop lights of those vehicles if the left and right stop lights of those vehicles are covered by a vehicle driving immediately ahead of the ego-vehicle or by other objects. In particular, the statutory provision stipulating that the raised stop light must be arranged on the rear side of the vehicle at a distance of not more than 150 mm below the rear window of the vehicle is made use of for the purpose of detecting such a stop light.

According to an advantageous further development of the invention according to the second solution and the third solution, the geometric region is detected as a raised stop light of the further vehicle if the geometric region is additionally positioned essentially in the middle of the horizontal structure of the detected object. This condition takes the statutory provision stipulating that the raised stop light must be arranged in the middle of the tail of the vehicle into account.

The inventive methods may be improved if the left stop light and the right stop light are not covered at the same time but if, e.g., only the left stop light is covered due to an offset vehicle driving ahead of the ego-vehicle so that both the raised stop light and the right stop light of a vehicle driving further ahead of the ego-vehicle in a convoy of vehicles can be detected by the camera.

According to an advantageous further development, the further geometric region is detected in the image data as a left stop light or a right stop light if the distance between the raised stop light and the further geometric region is the hypotenuse of a right triangle and the length of the vertical cathetus and the length of the horizontal cathetus of the right triangle are in defined proportion to each other. Thus, the geometric arrangement of the raised stop light and of the left stop light or the right stop light on the rear side of the vehicle is advantageously made use of. Preferably, according to said defined proportion, the vertical cathetus is shorter than the horizontal cathetus of the right triangle or the vertical cathetus is not longer than three times the length of the horizontal cathetus of the right triangle.

In the inventive method, an acoustic and/or visual and/or haptic warning are/is outputted as a driver assistance function upon detection of a stop light. Additionally or alternatively, an intervention in the longitudinal dynamics and/or lateral dynamics of the vehicle (preferably, the initiation of a braking operation) may be performed as a driver assistance function.

BRIEF DESCRIPTION OF THE DRAWINGS

In the following, the invention will be explained in greater detail with reference to the attached figures, in which.

DETAILED DESCRIPTION OF EXAMPLE EMBODIMENTS OF THE INVENTION

Figure 1:
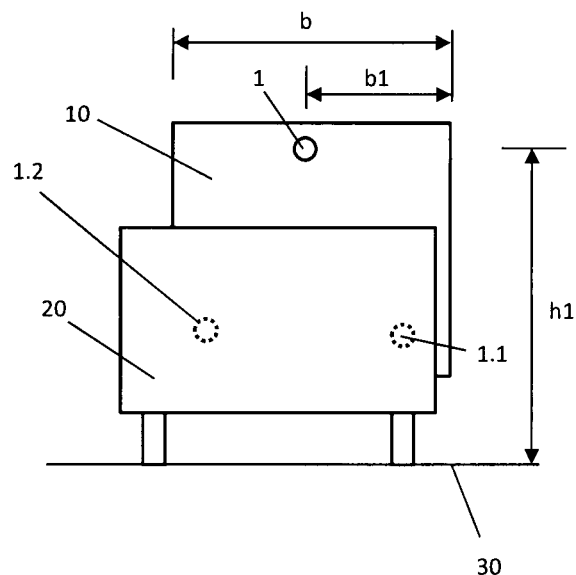
FIG. 1 shows a schematic representation of vehicles driving ahead as viewed by a camera of a following vehicle for explaining exemplary embodiments of the inventive method.
Figure 2:
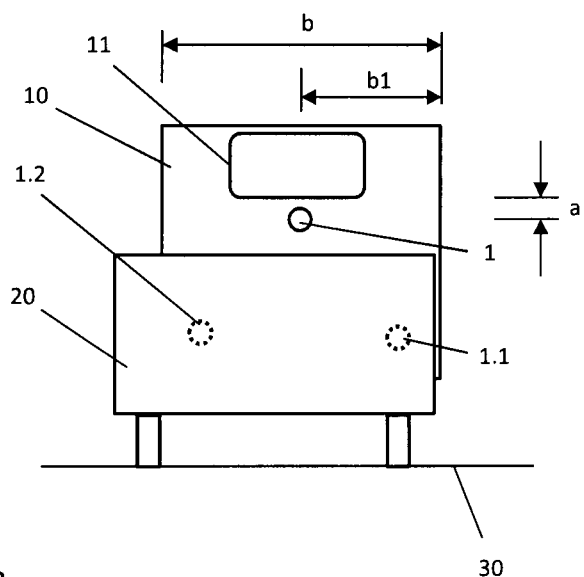
FIG. 2 shows a further schematic representation of vehicles driving ahead as viewed by a camera of a following vehicle for explaining further exemplary embodiments of the inventive method.
Figure 3:
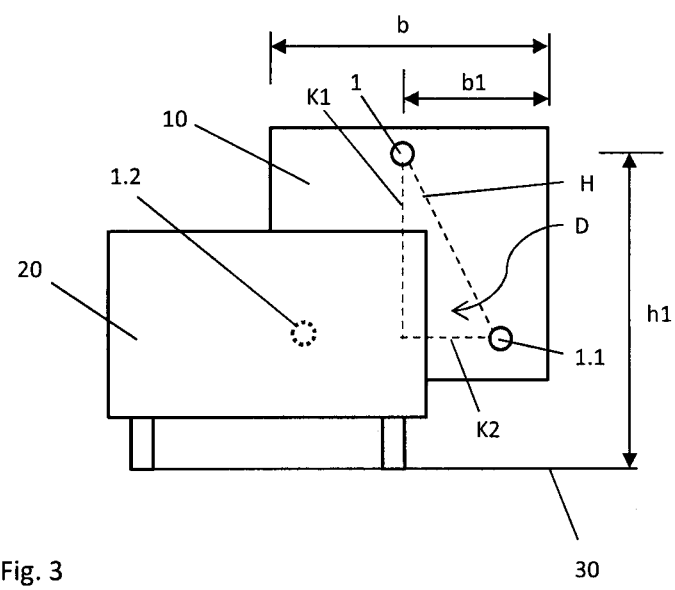
FIG. 3 shows a further schematic representation of vehicles driving ahead as viewed by a camera of a following vehicle for explaining further exemplary embodiments of the inventive method.

FIGS. 1 through 3 show the image of image data acquired by a camera of a following vehicle, said image data being data of that part of the surroundings which is in front of the vehicle, wherein vehicles driving ahead 10 and 20 can be seen in the visual range of the camera, wherein FIGS. 1 and 2 show a situation in which a right stop light 1.1 and a left stop light 1.2 are covered by a vehicle 20 positioned between the following vehicle equipped with the camera and the vehicle 10. The image data acquired by the camera is supplied to an analyzing unit for the purpose of analysis.

First Exemplary Embodiment:

Analysis is performed by determining a geometric region of a detected object (of the vehicle 10 in the present case) in the image data, the pixels of said region essentially exhibiting the highest brightness values in the image data and the spectral color red.

A second condition for detecting this geometric region as a raised stop light 1 is that this geometric region must be detected to be positioned essentially in the middle of the horizontal structure of the detected object 10. For this purpose, a determination of the width b of the vehicle 10 and a check as to whether this geometric region exhibits a distance b1 from the lateral edges of the object 10 are performed.

To improve the accuracy of detection of the raised stop light 1, a third condition may be checked. This third condition is that the geometric region must be positioned at least at a predetermined height h1 (850 mm) above the pavement 30. This complies with the statutory provision stipulating that such a raised stop light must be mounted on the rear side of the vehicle 10 at least 850 mm above the pavement.

The detection of such a raised stop light 1 results in the assumption that this vehicle 10 is performing a braking operation. Therefore, an acoustic and/or visual and/or haptic warning are/is outputted, as a driver assistance function, to the driver of the following vehicle. Additionally or alternatively, an intervention in the longitudinal dynamics and/or lateral dynamics of the vehicle (particularly, the initiation of a braking operation) may be performed as a driver assistance function.

Second Exemplary Embodiment:

In this exemplary embodiment referring to FIG. 1, image data analysis starts, as in the first exemplary embodiment, with determining a geometric region of a detected object (of the vehicle 10 in the present case) as a first condition for detecting a raised stop light, the pixels of said region essentially exhibiting the highest brightness values in the image data and the spectral color red.

A second condition for detecting this geometric region as a raised stop light 1 is that the geometric region must be positioned at least at a predetermined height h1 (850 mm)

above the pavement 30. This again complies with the statutory provision such a raised stop light 1 must comply with.

To improve the accuracy of detection of the raised stop light 1, a third condition may be checked. This third condition is that the geometric region must be positioned essentially in the middle of the horizontal structure of the detected object 10. For this purpose, a determination of the width b of the vehicle 10 and a check as to whether this geometric region exhibits a distance b1 from the lateral edges of the object 10 are performed.

The detection of such a raised stop light 1 results in the assumption that this vehicle 10 is performing a braking operation. Therefore, an acoustic and/or visual and/or haptic warning are/is outputted, as a driver assistance function, to the driver. Additionally or alternatively, an intervention in the longitudinal dynamics and/or lateral dynamics of the vehicle (particularly, the initiation of a braking operation) may be performed as a driver assistance function.

Third Exemplary Embodiment:

In this third exemplary embodiment referring to FIG. 2, image data analysis starts, as in the first and second exemplary embodiments, with determining a geometric region of a detected object (of the vehicle 10 in the present case) as a first condition for detecting a raised stop light, the pixels of said region essentially exhibiting the highest brightness values in the image data and the spectral color red.

A second condition for detecting this geometric region as a raised stop light 1 is complied with if this geometric region is positioned at a predetermined distance a (not more than 150 mm) below a detected rear window 11 of the further vehicle 10. This requires the detection of such a rear window 21 of the vehicle driving ahead 10 by means of the analyzing unit. The statutory provision stipulating that the raised stop light must be arranged on the rear side of the vehicle at a distance of not more than 150 mm below the rear window of the vehicle is made use of for the purpose of detecting such a stop light.

To improve the accuracy of detection of the raised stop light 1, a third condition may be checked. This third condition is that the geometric region is positioned essentially in the middle of the horizontal structure of the detected object 10. For this purpose, a determination of the width b of the vehicle 10 and a check as to whether this geometric region exhibits a distance b1 from the lateral edges of the object 10 are performed.

The detection of such a raised stop light 1 results in the assumption that this vehicle 10 is performing a braking operation. Therefore, an acoustic and/or visual and/or haptic warning are/is outputted, as a driver assistance function, to the driver. Additionally or alternatively, an intervention in the longitudinal dynamics and/or lateral dynamics of the vehicle (particularly, the initiation of a braking operation) may be performed as a driver assistance function.

Fourth Exemplary Embodiment:

This fourth exemplary embodiment refers to FIG. 3, which shows that the vehicle driving ahead 2 is not covering both stop lights 1.1 and 1.2 but only the left stop light 1.2 so that the right stop light 1.1 can be detected by the camera of the following vehicle.

Analysis starts with detecting geometric regions in the image data of the region of a detected object (of the vehicle 10 in the present case) as a first condition, the pixels of said regions essentially exhibiting the highest brightness values in the image data and the spectral color red. If two such regions are detected, a check as to whether one of the two geometric regions is a raised stop light 1 is performed on the basis of the conditions explained in the exemplary embodiments above. If this is the case, the assumption that the two detected geometric regions are a raised stop light 1 and a right stop light 1.1 is proceeded on.

To improve the accuracy of detection of the raised stop light 1 and the right stop light 1.1, a further condition is checked according to FIG. 3, wherein a check as to whether the distance between the raised stop light 1 and the further geometric region 1.1 (right stop light) is the hypotenuse H of a right triangle D and the length of the vertical cathetus K1 and the length of the horizontal cathetus K2 of the right triangle D are in defined proportion to each other is performed. Thus, the geometric arrangement of the raised stop light and of the left stop light or the right stop light on the rear side of the vehicle is advantageously made use of. According to said defined proportion, the vertical cathetus K1 is shorter than the horizontal cathetus K2 of the right triangle D or the vertical cathetus K1 is not longer than three times the length of the horizontal cathetus K2 of the right triangle D.

The detection of such a raised stop light 1 and the simultaneous detection of a right stop light 1.1 result in the assumption that this vehicle 10 is performing a braking operation. Therefore, an acoustic and/or visual and/or haptic warning are/is outputted, as a driver assistance function, to the driver. Additionally or alternatively, an intervention in the longitudinal dynamics and/or lateral dynamics of the vehicle (particularly, the initiation of a braking operation) may be performed as a driver assistance function.

REFERENCE NUMERALS 1 raised stop light
1.1 right stop light
1.2 left stop light
10 further vehicle
11 rear window of vehicle 10
20 vehicle
30 pavement

The invention claimed is:

1. A method of triggering a driver assistance function of a subject vehicle, comprising:
  with a camera, generating image data of a part of surroundings in front of the subject vehicle;
  with an analyzing unit, analyzing the image data, and therein detecting a further vehicle and a first geometric region of the further vehicle, wherein pixels of the first geometric region exhibit a spectral color red and approximately highest brightness values in the image data;
  determining that the first geometric region is an illuminated raised brake light of the further vehicle when the first geometric region is detected as having at least one of the following positioning features in the image data:
    (a) a first positioning feature wherein the first geometric region is positioned at least approximately in a horizontal middle of a horizontal structure of the further vehicle,
    (b) a second positioning feature wherein the first geometric region is positioned at or above a predetermined height above a roadway surface that is detected in the image data, or
    (c) a third positioning feature wherein the first geometric region is positioned at or below a predetermined distance below a rear window of the further vehicle that is detected in the image data, detecting a second geometric region in the image data, and determining that the second geometric region is a left brake light or a right brake light of the further vehicle when a distance between the raised brake light and the second geometric region forms a sloping hypotenuse of a virtual right triangle, and a length of a vertical leg and a length of a horizontal leg of the virtual right triangle are in a pre-defined proportion to one another; and triggering the driver assistance function in response to at least said determining that the first geometric region is the illuminated raised brake light.

2. The method according to claim 1, wherein the first geometric region is determined to be the illuminated raised brake light when the first geometric region is detected as having at least the first positioning feature.

3. The method according to claim 2, wherein the first geometric region is determined to be the illuminated raised brake light only when the first geometric region is detected as having at least both the first positioning feature and the second positioning feature.

4. The method according to claim 3, wherein the first geometric region is determined to be the illuminated raised brake light only when the first geometric region is detected as having all three of the first positioning feature, the second positioning feature and the third positioning feature.

5. The method according to claim 1, wherein the first geometric region is determined to be the illuminated raised brake light when the first geometric region is detected as having at least the second positioning feature.

6. The method according to claim 5, wherein the first geometric region is determined to be the illuminated raised brake light only when the first geometric region is detected as having at least both the second positioning feature and the third positioning feature.

7. The method according to claim 1, wherein the first geometric region is determined to be the illuminated raised brake light when the first geometric region is detected as having at least the third positioning feature.

8. The method according to claim 7, wherein the first geometric region is determined to be the illuminated raised brake light only when the first geometric region is detected as having at least both the first positioning feature and the third positioning feature.

9. The method according to claim 1, wherein according to said pre-defined proportion, the vertical leg is shorter than the horizontal leg of the virtual right triangle.

10. The method according to claim 1, wherein according to said pre-defined proportion, the vertical leg is at most three times as long as the horizontal leg of the virtual right triangle.

11. The method according to claim 1, wherein the driver assistance function comprises outputting to a driver of the vehicle at least one of an acoustic warning, a visual warning, or a haptic warning.

12. The method according to claim 1, wherein the driver assistance function comprises performing an automatic intervention in controlling at least one of longitudinal dynamics or lateral dynamics of the vehicle.

13. The method according to claim 12, wherein the automatic intervention comprises automatically actuating brakes of the vehicle.

14. The method according to claim 1, wherein said triggering of the driver assistance function is performed only in response to a combination of both said determining that the first geometric region is the illuminated raised brake light and said determining that the second geometric region is the left brake light or the right brake light.

15. The method according to claim 14, wherein said detecting of the second geometric region in the image data comprises detecting that pixels of the second geometric region exhibit a spectral color red and approximately highest brightness values in the image data.

* * * * *